Sept. 16, 1958 F. PUTZ 2,851,893
SPEED RESPONSIVE CLUTCH
Filed April 25, 1955 2 Sheets-Sheet 1

INVENTOR.
FRANK PUTZ
BY Lee H. Kaiser
ATTORNEY

Sept. 16, 1958    F. PUTZ    2,851,893
SPEED RESPONSIVE CLUTCH

Filed April 25, 1955    2 Sheets-Sheet 2

INVENTOR.
FRANK PUTZ
BY *Lee H. Kaiser*
ATTORNEY

United States Patent Office 2,851,893
Patented Sept. 16, 1958

2,851,893

SPEED RESPONSIVE CLUTCH

Frank Putz, Wauwatosa, Wis.

Application April 25, 1955, Serial No. 503,671

26 Claims. (Cl. 74—230.17)

This invention relates to speed responsive clutches.

In many commercially available speed responsive clutches, the members responsive to centrifugal force are wedged in position solely by centrifugal force to drivingly connect the driving and driven members, and these centrifugally responsive members release when the centrifugal force diminishes below a predetermined value. Consequently, the speed at which such a clutch disengages is almost as high as the speed at which the clutch engages, and the driven member is often undesirably released during low operating speeds.

It is an object of the invention to provide an improved speed responsive clutch which is simple in construction and inexpensive to manufacture.

It is a further object of the invention to provide a speed responsive clutch wherein the speed of disengagement is considerably lower than the speed of engagement.

Another object of the invention is to provide such a clutch with centrifugally responsive members and having novel means for locking said members in their engaged, or driving, position.

A still further object of the invention is to provide a speed responsive clutch having means to prevent eccentric motion of the segments, whereby chattering and vibration of the clutch is minimized and engagement with the driven member is smooth, uniform, and positive.

A speed responsive clutch constructed in accordance with the invention has a driving member, a plurality of centrifugally responsive members adapted to engage a driven member, and a plurality of means for drivingly connecting said centrifugally responsive members with said driving member, each of said means including a pin carried by one of the members and an elongated recess in the other member slidably receiving the pin, the recess being so inclined that tangentially directed forces acting on the centrifugally responsive members, for example, frictional drag by the driven member, e. g., a belt, and turning moment exerted by the driving member, have a maximum component along the longitudinal axis of said recess whereas radially directed forces tending to move said centrifugally responsive members to a radially inward position, and thus cause the clutch to release, have only a minimum component along said longitudinal axis.

In its preferred form the invention is adapted to provide a driving connection between a belt and rotatable shaft driven from a power source, and may thus be termed a centrifugal pulley, whereas in alternative embodiments the centrifugally responsive members directly engage a rotatable driven member.

For a better understanding of the principles and objects of the invention, reference should be had to the following detailed description taken in conjunction with the accompanying drawing wherein.

Figure 1:
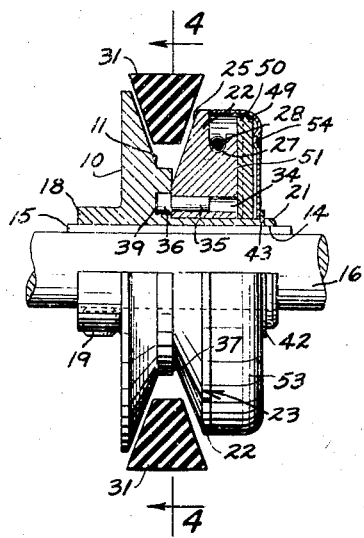
Fig. 1 is an elevation view, partly in section, through the preferred embodiment of the invention with the centrifugally responsive members in their radially inward, or disengaged position.

In the preferred embodiment of the invention illustrated in Figs. 1 through 5, a unitary driving disc 10 having a frusto-conical, belt engaging surface 11 on the inner face near the outer margin thereof is provided with an axial bore 12 having a keyway slot 14 in the inner periphery thereof adapted to receive a key 15 and thus permit keying the disc 10 to a rotatable shaft 16 extending through the axial bore 12 and operatively connected to a suitable drive means (not shown).

Figure 2:
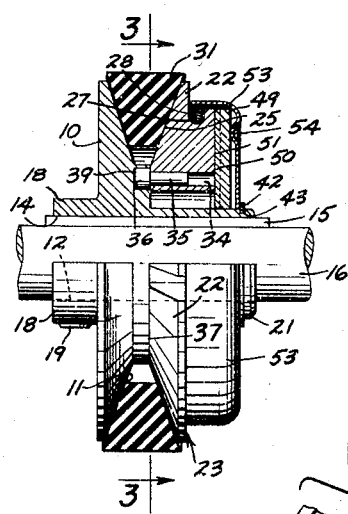
Fig. 2 is a view similar to Fig. 1 but with the centrifugally responsive members in their radially outward position wherein they are adapted to frictionally engage a belt.

The disc 10 forms half of a sheave, or half of a pulley wheel. A radial aperture in a hub 18 extending to the left of disc 10 as seen in Figs. 1 and 2 is threaded to receive a set screw 19 to provide alternative means of engaging the disc 10 with the shaft 16. A hub 21 extends from the disc 10 on the side opposite the hub 18.

Figure 3:
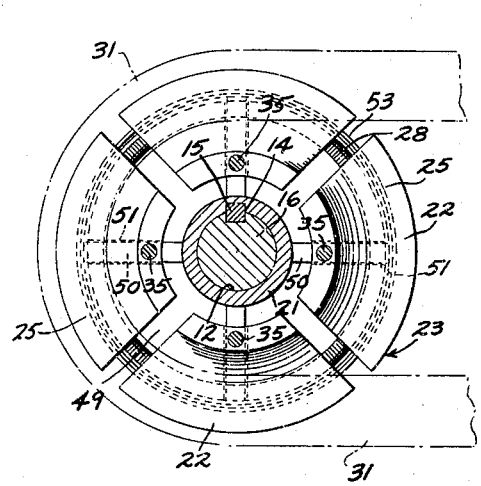
Fig. 3 is a sectional view taken on line 3—3 of Fig. 2.

As best seen in Fig. 3, a plurality of centrifugally responsive segments 22 circumjacent the hub 21 jointly forms a multi-segmented disc 23, or half a pulley wheel, opposite the unitary driving disc 10. Four centrifugally responsive segments 22 are illustrated in the preferred embodiment of the invention, but it will be appreciated that any desired number of segments 22 may be utilized. A frusto-conical belt-engaging surface 25 is provided near the outer margin of the multi-segmented disc 23 jointly formed by the centrifugal segments 22, the belt-engaging surface 25 being opposite the belt engaging frusto-conical surface 11 on the disc 10 when the segments 22 are in their radially outward, or engaged, position as shown in Fig. 3. Peripheral grooves 27 in each of the centrifugal segments 22 jointly form a circumferential groove adapted to receive a tension spring, or garter spring 28, which normally resiliently retains the segments 22 in their radially inward, or disengaged, position against the hub 21.

Figure 5:
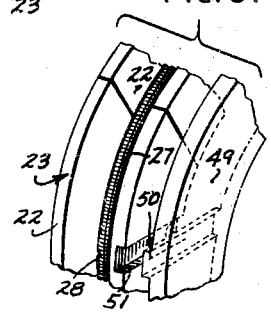
Fig. 5 is an auxiliary view in perspective showing the means for preventing eccentric rotational movement of the centrifugally responsive members.

In the normal, or radially inward, position of segments 22, the radial sides of segments 22 are contiguous as seen in Fig. 5, and as seen in Fig. 1 the multi-segmented disc 23 formed jointly by the segments 22 is of smaller diameter than the disc 10 and the frusto-conical surface 25 thereon is free of a belt 31 disposed between the unitary disc 10 and the multi-segmented disc 23.

Figure 4:
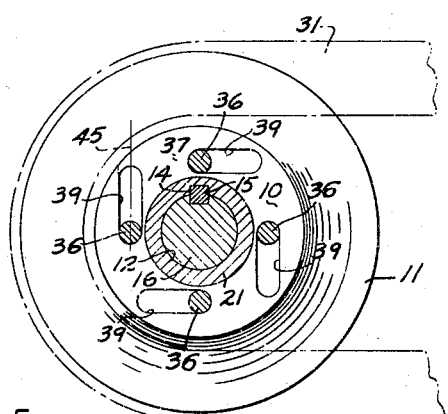
Fig. 4 is a sectional view taken on line 4—4 of Fig. 1.

A plurality of means are provided for drivingly connecting each of the centrifugally responsive members 22 with the driving member 10 and for locking the centrifugally responsive members 22 in their engaged position, each of the means including a pin carried by one of the members and the other of the members having an elongated recess for slidably receiving the pin. In the preferred embodiment each centrifugally responsive segment 22 is provided with an aperture 34 which receives the shank of a short rod, or pin 35 having a headed portion 36 extending parallel to the axis of shaft 16. It will be appreciated that the pin 35 can take the form of a stud integral with and extending from segment 22, and it is intended by the word "carried" in the appended claims to cover both the construction wherein the pin is integral with the centrifugally responsive member and the arrangement where the pin is releasably affixed within said member. As best seen in Fig. 4 the annular surface 37 on the inner face of unitary disc 10 between hub 21 and frusto-conical surface 11 is provided with a plurality of peripherally spaced apart, elongated recesses 39, equal in number to the centrifugally responsive segments 22. Each recess 39 slidably and rotatably receives the headed portion 36 of one of the pins 35. Normally the spring 28 resiliently urges the centrifugally responsive segments 22 to a position wherein the headed portion 36 of each pin 35 is in the radially inward end of the recesses 39. A retaining ring 42 within a circumferential groove 43 in the hub 21 prevents movement of segments 22 in a direction axially away from the unitary driving disc 10.

Figure 9:
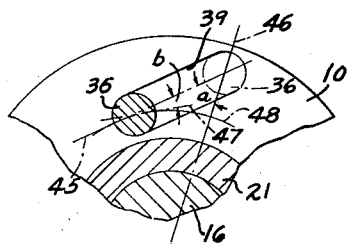
Fig. 9 is an auxiliary view schematically illustrating the directions in which the forces utilized in the locking means of the preferred embodiment of the invention are directed.

The centrifugally responsive segments 22 are adapted in response to a predetermined rotational velocity to move outward to an engaged position wherein the headed portions 36 of the pins 35 are in the radially outward end of the recesses 39 as shown in Figs. 2 and 3. In this position the diameter of multi-segmented disc 23 is equal to that of driving disc 10 and the frusto-conical belt engaging surface 25 frictionally engages belt 31, the approximate position of the belt 31 being schematically represented by dash-dot lines in Fig. 3. As best seen in Fig. 9 the elongated recesses 39 are so inclined that tangentially directed forces acting on segments 22 have a maximum component along the longitudinal axis 45 of the recesses 39 whereas radially directed forces have a minimum component in the direction of said longitudinal axis 45. As a consequence of this inclination of the elongated recesses 39, tangentially directed forces, for example, due to the moment exerted by driving disc 10 tending to rotate the multi-segmented disc 23 about the axis of shaft 16 and due to frictional drag of belt 31 on segments 22, are exerted principally along the longitudinal axis 45 and cause the segments 22 to move the headed portions 36 of the pins 35 to the radially outward end of the recesses 39, whereas radially inward directed forces due to tension in belt 31 and in spring 28 tending to cause the segments 22 to move the pins 35 to the radially inward end of recesses 39, and thus disengage the clutch, are exerted mainly against the walls defining the recesses 39 and have only a minimum component in the direction of the longitudinal axis 45. Consequently, a mechanical advantage of considerable magnitude is provided tending to lock the segments 22 in their engaged position wherein the pins 35 are in the radially outward end of recesses 39, and the clutch of the invention greatly resists any tendency to release due to belt tension. Further, the segments 22 positively disengage at a predetermined release speed and the difference between speeds of engagement and release is considerably higher than in prior art devices.

To provide a substantial mechanical advantage for locking segments 22 in their engaged position with the headed portion 36 of the pins 35 in the radially outward end of the recesses 39, the longitudinal axis of each recess 39 is preferably at an angle $a$ (see Fig. 9) of greater than sixty degrees with the radius 46 intersecting the pin 35 at the radially outward end of recess 39. As a consequence of this inclination of recess 39, the angle $b$ between the longitudinal axis 45 and the tangent 47 to a circle 48 concentric with disc 10 and intersecting the pin 35 in the radially inward end of recess 39 at the point where said circle 48 intersects pin 35 is less than thirty degrees, and any tangentially directed force due to frictional drag of belt 31 tending to move a segment 22 in the opposite direction from which unitary disc 10 is turning has a component equal to at least $\cos b = 0.866$ in the direction of the longitudinal axis 45 tending to move pin 35 to the radially outward end of recess 39, whereas radially inward directed forces due to belt tension exerted against segments 22 have a component which is always less than $\cos a = 0.500$ tending to move pin 35 along the longitudinal axis 45 of the recess 39. As shown in Fig. 4 the longitudinal axis 45 of the preferred embodiment has an inclination of ninety degrees to the radius intersecting pin 35 at the radially inward end of the recess 39, i. e., angle $b=0$ degrees, and substantially all of the available tangentially directed forces acting on segments 22 are directed along longitudinal axis 45 tending to move pin 35 to the radially outward end of recess 39, whereas radially inward directed forces acting upon segments 22 and tending to move pins 35 from the radially outward to the radially inward end of the recesses 39 have a minimum component in the direction of the recesses.

Means are provided in the preferred embodiment of the invention to permit only radial movement of segments 22 relative to a common member and thus prevent eccentric rotational movement of the segments 22. As best seen in Fig. 5, a circular plate 49 circumjacent hub 21 between the multi-segmented disc 23 and the retaining ring 42 is provided with a plurality of peripherally spaced apart, radially extending projections 50 on the face thereof opposite the multi-segmented disc 23. Each segment 22 is provided on the face away from driving disc 10 with a radially extending groove 51 which slidably receives a projection 50 on the circular plate 49. The cooperating projections 50 and grooves 51 permit only radial movement of segments 22 relative to the circular plate 49 and cause the segments 22 and circular plate 49 to shift as a unit peripherally relative to driving disc 10 as the headed portions 36 of the pins 35 slide and rotate within the recesses 39 when segments 22 move from one end of the recesses 39 to the other. It will be apparent that eccentric rotational movement of segments 22 is prevented by this construction, and as a consequence, vibration and chattering of the speed responsive clutch of the invention is positively prevented, grabbing of the driven member, i. e., belt 31, is eliminated, and engagement of the driven member is uniform, smooth, and positive.

A cup-shaped cover 53 circumjacent the hub 21 between the circular plate 49 and the retaining ring 42 prevents accumulation of dirt, moisture, or grease on or between the segments 22, the spring 28, or the circular plate 49 which might interfere with the smooth operation of the clutch. The cover 53 is preferably of resilient metallic material, for example, mild steel, and an annular embossing 54 formed therein bears against the circular plate 49. The cover 53 thus acts as a resilient washer tending to urge the plate 49 against the multi-segmented disc 23 and the segments 22 against the driving disc 10.

It will be appreciated that if a narrower clutch is desired, the circular plate 49 may be omitted and the radially extending projections 50 formed directly in the cover 53.

Figure 6:
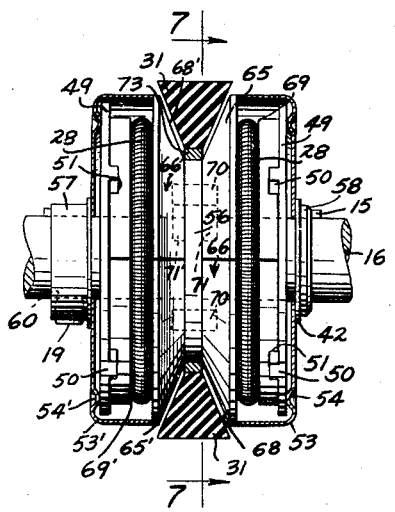
Fig. 6 is an elevation view, partly in section, of an alternative embodiment of the invention.
Figure 7:
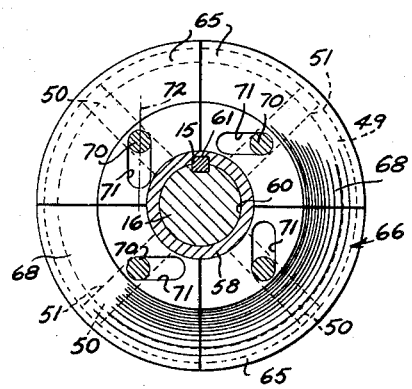
Fig. 7 is a sectional view taken on line 7—7 of Fig. 6.

In an alternative embodiment of the invention shown in Figs. 6 and 7, two sets of centrifugally responsive segments jointly form a sheave and are adapted in response to a predetermined rotational velocity to simultaneously move outward and frictionally engage and drive a belt disposed therebetween. A driving disc 56 having hubs 57 and 58 on opposite sides thereof is provided with an axial bore 60 having a keyway slot 61 in the inner periphery thereof adapted to receive a key 15 for keying the driving disc 56 to a rotatable shaft 16 extending through the axial bore 60 and operatively connected to suitable drive means (not shown). A radial aperture in the hub 57 is threaded to receive a set screw 19 to provide alternative means for engaging the driving disc 56 with the rotatable shaft 16. A plurality of centrifugally responsive segments 65 jointly form a multi-segmented disc, or half pulley wheel, 66 circumjacent the hub 58 and having a frusto-conical belt engaging surface 68 near the outer margin thereof. Similarly a plurality of centrifugally responsive segments 65' jointly form a multi-segmented disc 66', or half pulley wheel, 66' circumjacent the hub 57 and having a conical belt engaging surface 68' opposite the conical surface 68. The multi-segmented discs 66 and 66' are complementary and only disc 66 will be described, the elements of multi-segmented disc 66' being given the same reference numerals as the parts of multi-segmented disc 66 to which they are similar with the addition of the prime (') designation. Peripheral grooves 69 in each of the segments 65 jointly form a circumferential groove adapted to receive a tension spring, or garter spring, 28 which resiliently retains the segments 65 in their radially inward position. A retaining ring 42 within a circumferential groove in the hub 58 prevents movement of the segments 65 in a direction axially away from the driving disc 56.

In the preferred embodiment of Figs. 1 through 5 the means for drivingly connecting the driving member and the centrifugally responsive segments and for locking the segments in their radially outward engaged position includes elongated recesses in the driving member slidably and rotatably receiving pins carried by the centrifugally responsive segments. The mechanical advantage of the locking means of the present invention is obtained regardless of whether the elongated recesses are in the driving member or in the centrifugally responsive members, and in the embodiment of Figs. 6 and 7 a plurality of pins 70 equal in number to the segments 65 (and to the segments 65') extend through and protrude on both sides of the driving member 56 parallel to the axis of shaft 16. An elongated recess 71 provided in each centrifugally responsive segment 65 slidably and rotatably receives one protruding end of a pin 70, and similar elongated recesses 71' in the centrifugally responsive segments 65' slidably and rotatably receive the opposite protruding end of the pins 70. The tension spring 28 normally resiliently retains the segments 65 in a position wherein the ends of the pins 70 are in the radially outward end of the recesses 71. The elongated recesses 71 are inclined at angles similar to the recesses 39 of the embodiment of Figs. 1 through 5, e. g., the longitudinal axis 72 of each elongated recess 71 is preferably inclined at an angle of greater than sixty degrees with the radius intersecting the pin 70 when the pin 70 is in the radially inward end of the recess.

Tangentially directed forces acting on a segment 65 due to the turning moment exerted by disc 56 and transmitted through pin 70 against a wall defining a recess 71, or due to frictional drag of belt 31 on a segment 65, tending to move the segment relative to the driving disc 56, have a maximum component in the direction of the longitudinal axis 72, thereby causing the segments 65 and 65' to move outward until the pins 70 are in the radially inward end of the recesses 71 and 71' and the frusto-conical belt engaging surfaces 68 and 68' frictionally engage opposite sides of a belt 31 disposed between the multi-segmented discs 66 and 66'. In a manner similar to the preferred embodiment, radially inwardly directed forces acting on a segment 65 due to tension on belt 31 and tension in spring 28 are principally exerted in urging the wall of a recess 71 against a pin 70 and have only minimum component in a direction along the longitudinal axis 72. Consequently, the unique locking of the segments in their engaged position, the low disengagement speed and the wide spread between speeds of clutch engagement and release provided in the preferred embodiment are also attained in the embodiment of Figs. 6 and 7.

Means identical to the preferred embodiment are provided to permit radial movement only of segments 65 relative to a given member and thus prevent eccentric rotational movement of the segments 65. A circular plate 49 circumjacent the hub 58 between the multi-segmented disc 66 and the retaining ring 42 has a plurality of peripherally spaced apart, radially extending projections 50 thereon. Each segment 65 is provided with a radially extending groove 51 which slidably receives one of the projections 50 and the cooperating grooves 51 and projections 50 permit only radial movement of segments 65 relative to plate 49, thereby causing the plate 49 and the segments 65 to shift as a unit peripherally relative to the driving member 56 as the segments move radially to cause the walls of the recesses 71 to slide along the pins 70. As a consequence of this construction, eccentric rotation of segments 65 is prevented, vibration and chattering of the clutch is eliminated, and the engagement of the centrifugally responsive segments 65 and 65' with belt 31 is smooth, positive, and uniform. In a manner identical to the preferred embodiment a cup-shaped cover 53 of resilient metallic material circumjacent the hub 58 between the multi-segmented disc 66 and the retaining ring 42 is provided with an annular embossing 54 which bears against the circular plate 49, and the cover 54 acts as a resilient washer urging the circular plate 49 against the multi-segmented disc 66 and the segments 65 against the driving disc 56 and aids in eliminating any possible chatter of segments 65.

In the embodiment of Figs. 6 and 7 an idler ring 73, preferably of material such as nylon or a self lubricating bronze bearing material commercially available under the trade-mark Oilite having excellent wearing qualities and providing a smooth bearing surface, rotates freely about driving disc 56 and normally permits a belt 31 which is maintained taut to turn freely about its true centers free of the centrifugally responsive segments 65 and 65' until the driving disc 56 is rotated at sufficiently high velocity to cause the segments 65 and 65' to simultaneously move outward and frictionally engage the frusto-conical surfaces 68 and 68' with the belt 31.

It will be apparent that the idler ring 73 may also be incorporated in the preferred embodiment shown in Figs. 1 through 5.

Figure 8:
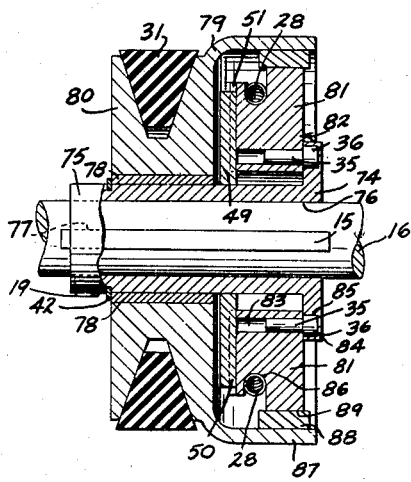
Fig. 8 is a sectional view taken through the axis of still another alternative embodiment of the invention wherein the centrifugally responsive members are adapted to directly engage a rotatable driven member.

In the alternative embodiment of the invention illustrated in Fig. 8 the centrifugally responsive members directly engage the member to be rotatably driven rather than a belt. A circumferentially flanged driving member 74 having a hub 75 is provided with an axial bore 76 having a keyway slot 77 in the inner periphery thereof adapted to receive a key 15 to permit keying the driving member 74 to a rotatable shaft 16 extending through the axial bore 76 and operatively connected to suitable drive means (not shown). A radial aperture in the hub 75 is threaded to receive a set screw 19 to provide alternative means to operatively engage driving member 74 with shaft 16.

A circumferential bearing 78 circumjacent to hub 75 rotatably journals a drum 79 having a sheave 80 integral therewith adapted to receive and drive a belt 31. A plurality of centrifugally responsive segments 81 jointly forms a multi-segmented disc 82 circumjacent the hub 75. Each segment 81 is provided with an aperture 83 which receives the shank of a pin 35 having a headed portion 36 extending parallel to the axis of shaft 16. The face of the circumferential flange 84 of the driving member 74 opposite the muti-segmented disc 82 is provided with a plurality of peripherally spaced apart, elongated recesses 85 each of which slidably and rotatably receives the headed portion 36 of one of the pins 35. The elongated recesses 85 are inclined at angles similar to those of the recesses 39 in the driving disc 10 of the preferred embodiment. The centrifugally responsive segments 81 are provided with peripheral grooves 86 which jointly form a circumferential groove adapted to receive a tension spring 28 which resiliently urges the segments 81 to a normal disengaged position wherein the pins 35 are in the radially inward end of the elongated recesses 85. Although the embodiment of Fig. 8 is illustrated as having the drum 79 driving a belt, it will be appreciated that any rotatable member may be driven by the drum 79.

The drum 79 is provided with a rim 87 extending parallel to the axis of shaft 16 and disposed radially outward from the segments 81. A peripheral band 88 of material having a coefficient of friction and heat dissipating properties suitable for a friction clutch, for example asbestos fabric, is provided in the inner periphery of the rim 87. A frictional clutching surface 89 is provided on the outer periphery of each centrifugally responsive segment 81. The spring 28 normally retains the segments 81 in a position wherein the pins 35 are in the radially inward end of the recesses 85 and the frictional clutching surfaces 89 are free of the peripheral band 88.

A circular plate 49 circumjacent hub 75 between multi-segmented disc 82 and the drum 79 is provided with a plurality of radially extending projections 50 in a manner similar to plate 49 of the preferred embodiment, and each segment 81 is provided with a radially extending groove 51 which slidably receives one of the projections 50. The projections 50 and grooves 51 cooperate to permit only radial movement of segments 81 relative to plate 49 in a manner similar to the preferred embodiment. A circumferential groove in the hub 75 receives a retaining ring 42 which prevents movement of drum 79 in a direction axially away from the segments 81.

The segments 81 are adapted in response to a predetermined rotational velocity to move to a radially outward, or engaged, position shown in Fig. 8 wherein the pins 35 are in the radially outward end of the recesses 85 and the frictional clutching surfaces 89 are in driving engagement with the peripheral band 88. Tangentially directed forces acting on segments 81 have a maximum component in the direction of the longitudinal axis of elongated recesses 85 in a manner identical to the preferred embodiment, and the same mechanical advantage tending to resist radially directed forces acting on the segments 81 is provided as in the preferred embodiment to effectively lock the segments 81 in engaged position with frictional clutching surfaces 89 in engagement with peripheral band 88.

Figure 10:
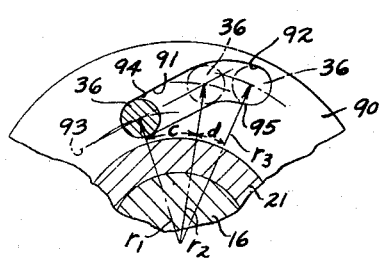
Fig. 10 is a partial view taken through an embodiment of the invention wherein the difference between the speed of engagement and release is greater than in the preferred embodiment.

Fig. 10 is a partial sectional view through an alternative embodiment wherein the difference between the speeds of clutch engagement and release is greater than in the preferred embodiment and is illustrative of the many different characteristics that can be obtained by changing the shape of the elongated recesses. With the exception of the driving member 90, all the clutch components are identical to the embodiment of Figs. 1 through 5. The driving member 90 is similar to the driving disc 10 except that the elongated recesses 91 provided therein include a hook portion 92 at the radially outward end thereof. The longitudinal axis 93 of the straight portion 94 of each recess 91 is inclined at an angle similar to the longitudinal axis 45 of the preferred embodiment and the hook portion 92 is so constructed that the radially inner wall 95 thereof is substantially tangentially directed and that radial directed forces acting upon the segments are substantially directed against the tangential wall 95 and thus have a negligible component in a direction to move the headed portion 36 of the pins 35 to the radially inward end of recesses 91. It will be appreciated that a maximum mechanical advantage is provided in the embodiment of Fig. 10 tending to lock the segments in their engaged, or radially outward, position.

In order to insure that the segments positively release at a predetermined speed, it is desirable that the hook portion 92 be so constructed that the radius $r_3$ of a circle intersecting the headed portion 36 of the pin 35 in the radially outward end of recess 91 is greater than the radius $r_2$ of a circle intersecting the headed portion 36 at the point where the straight portion 94 of the recess 91 ends and the hook portion 92 begins. However, to provide "locking action" within hook portion 92 (as contrasted with radial outward movement of the segments which is desired in the straight portion 94 of the recesses 91) it is desirable that the difference between $r_3$ and $r_2$ for a given angular displacement $d$ of the segment relative to the driving member, i. e., the ratio $$\frac{r_3 - r_2}{/d}$$

be considerably smaller than a similar ratio for the straight portion 94 of the recess 91, i. e., smaller than the difference between radius $r_2$ and radius $r_1$ at the radially inward end of the recess 91 for a given angular displacement $c$ of headed portion 36 of pin 35 (in other words, smaller than $$\frac{r_2 - r_1}{/c}$$

A small ratio of $$\frac{\Delta r}{\angle}$$

means that a relatively small radial movement of the segments is obtained for a given angular shift of the segments relative to the driving member 90, and consequently, that a "locking action is obtained.

In the preferred embodiment wherein the elongated recesses are illustrated as being rectilinear, the centrifugally responsive segments initially move only slightly in a radial direction for each degree of angular shift of the segments relative to the driving member, but move radially outward at an increasing rate for each degree of such angular shift as the pins approach the radially outward end of the recesses. It will be appreciated that the elongated recesses can be curved as desired to provide uniform movement in a radial direction for each degree of angular shift of the segments relative to the driving member, and it is intended in the appended claims that "longitudinal axis" cover not only the axis of a rectilinear recess but also the general direction of a curved or arcuate recess. Further, the speeds of engagement and disengagement of the centrifugal clutch of the invention can be changed as desired by varying the tension of the garter spring, the weight of the centrifugally responsive segments, or the shape or inclination of the elongated recesses.

Although in all of the illustrated embodiments the centrifugally responsive members have been shown as segments jointly forming a multi-segmented disc, the invention is not so limited, and satisfactory clutch operation can be obtained where the centrifugally responsive members have a configuration other than of a segment of a circle and are not contiguous to each other in their radially inward position. Further, other means than a tension spring may be utilized to resiliently urge the centrifugally responsive members to their disengaged position, for example an elastic member. Although in all the illustrated embodiments the centrifugally responsive members have been illustrated as disposed against a hub of the driving member, such construction is not necessary to the invention and the many advantages of the invention can be obtained when the driving member engages each centrifugally responsive member only through a pin in one of the members and an elongated recess in the other of the members slidably receiving the pin.

Although I have shown and described particular embodiments of my invention, it will be obvious to those skilled in the art that many changes and modifications may be made therein without departing from the invention, and I intend in the appended claims to cover all changes and modifications as fall within the true spirit and scope of my invention.

What I claim as new and desire to secure by Letters Patent of the United States is:

1. A speed responsive clutch comprising, in combination, an axially bored rotatable driving member having a frusto-conical belt engaging surface near the outer margin thereof, a plurality of centrifugally responsive members jointly forming a multi-segmented disc having a frusto-conical belt engaging surface opposite said frusto-conical surface on said driving member, a plurality of means for drivingly connecting said driving member and each said centrifugally responsive member and for locking said centrifugally responsive member in a radially outward position wherein said frusto-conical surface on said multi-segmented disc is in frictional engagement with a belt disposed between said frusto-conical surfaces on said driving member and said multi-segmented disc, each of said means including a pin carried by one of said members, the other member having an elongated recess slidably receiving said pin, resilient means for normally retaining said centrifugally responsive members in a radially inward position wherein said pins are in one end of said recesses and the frusto-conical surface on said multi-segmented disc is free of said belt, said centrifugally responsive members being adapted in response to a predetermined rotational velocity to simultaneously move to said radially outward position wherein said pins are in the opposite end of said recesses, the longitudinal axis of each of said recesses being inclined at an angle to the radius intersecting said pin when said pin is in said opposite end of said recess.

2. A speed responsive clutch comprising, in combination, an axially bored rotatable driving member having a frusto-conical belt engaging surface near the outer margin thereof, a plurality of centrifugally responsive members jointly forming a multi-segmented disc having a frusto-conical belt engaging surface opposite said frusto-conical surface on said driving member, a plurality of means for drivingly connecting said driving member and each said centrifugally responsive member and for locking said centrifugally responsive member in a radially outward position wherein said frusto-conical surface on said multi-segmented disc is in frictional engagement with a belt disposed between said frusto-conical surfaces on said driving member and said multi-segmented disc, each of said means including a pin carried by one of said members, the other member having an elongated recess slidably receiving said pin, resilient means for normally retaining said centrifugally responsive members in a radially inward position wherein said pins are in one end of said recesses and the frusto-conical surface on said multi-segmented disc is free of said belt, said unitary driving member having a circumferential shoulder opposite said multi-segmented disc, an idler ring rotatably supported on said shoulder and adapted to support said belt and permit it to turn free of said frusto-conical surface on said multi-segmented disc when said centrifugally responsive members are in said radially inward position, said centrifugally responsive members being adapted in response to a predetermined rotational velocity to simultaneously move to said radially outward position wherein said pins are in the opposite end of said recesses, the longitudinal axis of each said recess being inclined at an angle to the radius intersecting said pin when said pin is in said opposite end of said recess.

3. A speed responsive clutch comprising, in combination, an axially bored rotatable driving member having a frusto-conical belt engaging surface near the outer margin thereof, a plurality of centrifugally responsive segments jointly forming a multi-segmented disc having a frusto-conical belt engaging surface opposite said belt-engaging surface on said driving member, each of said segments carrying a pin, said driving member having a plurality of peripherally spaced apart, elongated recesses each of which slidably receives one of said pins, resilient means for normally retaining said segments in a radially inward position wherein said pins are in the radially inward end of said recesses and said belt engaging surface on said multi-segmented disc is free of a belt disposed between said frusto-conical surfaces on said driving member and said multi-segmented disc, said segments being adapted in response to a predetermined rotational velocity to simultaneously move to a radially outward position wherein said pins are in the radially outward end of said recesses and said frusto-conical surface on said multi-segmented disc is in frictional engagement with said belt, each of said elongated recesses being so inclined that the angle between the longitudinal axis of said recess and the radius intersecting said pin in said radially outward end of said recess is greater than sixty degrees.

4. A speed responsive clutch comprising, in combination, an axially bored rotatable driving member having a hub and being provided with a frusto-conical belt engaging surface near the outer margin thereof, a plurality of centrifugally responsive members jointly forming a multi-segmented disc circumjacent said hub and having a frusto-conical belt engaging surface opposite said belt engaging surface on said driving member, a plurality of means for drivingly connecting said driving member to each said centrifugally responsive member and for locking said centrifugally responsive member in a radially outward position wherein said frusto-conical surface on said multi-segmented disc is in frictional clutching engagement with a belt disposed between said driving member and said multi-segmented disc, each of said means including a pin carried by one of said members, the other member having an elongated recess slidably receiving said pin, resilient means for normally retaining said centrifugally responsive members in a radially inward position wherein said pins are in one end of said recesses and the frusto-conical surface on said multi-segmented disc is free of said belt, and means engaging said hub for preventing movement of said centrifugally responsive members in a direction axially away from said driving member, each of said recesses being so inclined that the angle between the longitudinal axis of said recess and the radius intersecting said pin when said pin is in the opposite end of said recess, is greater than sixty degrees, said centrifugally responsive members being adapted in response to a predetermined rotational velocity to simultaneously move to said radially outward position wherein said pins are in said opposite end of said recesses.

5. A speed responsive clutch comprising, in combination, an axially bored rotatable driving member having a hub and being provided with a frusto-conical belt engaging surface near the outer margin thereof, a plurality of centrifugally responsive segments jointly forming a multi-segmented disc circumjacent said hub and having a frusto-conical belt engaging surface near the outer margin thereof opposite the belt-engaging surface on said driving member, each of said segments carrying a pin, said driving member having a plurality of peripherally spaced apart elongated recesses in the face thereof between said hub and said frusto-conical surface each slidably receiving one of said pins, resilient means for normally retaining said segments in a position wherein said pins are in the radially inward end of said recesses and said frusto-conical surface on said multi-segmented disc is free of a belt disposed between said frusto-conical surfaces on said driving member and said multi-segmented disc, the longitudinal axis of each said recess being inclined at an angle of greater than sixty degrees with the radius intersecting said pin when said pin is in the radially outward end of said recess, said segments being adapted to move simultaneously under the influence of centrifugal force to a position wherein said pins are in the radially outward end of said recesses and said frusto-conical surfaces on said driving member and said multi-segmented member engage opposite sides of said belt, and means engaging said hub for preventing movement of said segments in a direction axially away from said driving member.

6. A speed responsive clutch comprising, in combination, an axially bored rotatable driving disc having a hub and being provided with a frusto-conical belt engaging surface near the outer margin thereof, a plurality of centrifugally responsive segments jointly forming a multi-segmented disc circumjacent said hub, and having a frusto-conical belt engaging surface near the outer margin thereof opposite said belt engaging surface on said driving disc, each of said segments carrying a pin, said driving disc having a plurality of peripherally spaced apart elongated recesses each of which slidably receives one of said pins, resilient means for normally urging said segments to a position wherein said pins are in the radially inward end of said recesses and said frusto-conical surface on said multi-segmented disc is free of a belt disposed between said multi-segmented disc and said driving disc, said centrifugally responsive segments being adapted in response to a predetermined rotational velocity to move simultaneously to a position wherein said pins are in the radially outward end of said recesses and said frusto-conical surfaces on said multi-segmented disc and said driving disc engage opposite sides of said belt.

7. A speed responsive clutch comprising, in combination, an axially bored driving member having hub portions on both sides thereof, a plurality of centrifugally responsive members jointly forming a first multi-segmented disc circumjacent one of said hub portions and having a frusto-conical belt engaging surface near the outer margin thereof, a plurality of centrifugally responsive members jointly forming a second multi-segmented disc circumjacent said other hub portion and having a frusto-conical belt engaging surface near the outer margin thereof opposite the belt engaging surface on said first disc, a plurality of means for drivingly connecting each said centrifugally responsive member to said driving member, each of said means including a pin carried by one of the members, the other member having an elongated recess slidably receiving said pin, resilient means for normally retaining said centrifugally responsive members in a radially inward position wherein said pins are in one end of said recesses and said belt engaging surfaces on said multi-segmented discs are free of said belt, said segments being responsive to a predetermined rotational velocity to move simultaneously to a radially outward position wherein said pins are in the opposite end of said recesses and said frusto-conical surfaces on said first and second multi-segmented discs engage opposite sides of said belt, and means for preventing movement of said segments in a direction axially away from said driving disc, the longitudinal axis of each said elongated recess being inclined at an angle to the radius intersecting said pin when said pin is in said opposite end of said recess.

8. A speed responsive clutch comprising an axially bored rotatable driving member having a hub, a plurality of centrifugally responsive segments jointly forming a multi-segmented disc circumjacent said hub and having a frictional clutching surface near the outer margin thereof, each of said segments carrying a single pin, said driving member having a plurality of peripherally spaced apart, elongated recesses each of which slidably and rotatably receives one of said pins, resilient means for normally retaining said segments in a position wherein said pins are in one end of said recesses, the opposite end of each said recess being radially outward from said one end and said radially outward end being circumferentially spaced from said radially inward end in a direction opposite to the direction of rotation of said driving member, an interlocking member circumjacent said hub and rotatable relative to said driving member, means for permitting said segments to move in a radial direction only relative to said interlocking member including a plurality of peripherally spaced apart, radially extending projections on said interlocking member, each of said segments having a radially extending recess slidably receiving one of said projections, and means engaging said hub for preventing movement of said segments and said interlocking member in a direction axially away from said driving member, said centrifugally responsive segments being adapted in response to a predetermined rotational velocity to move simultaneously to a radially outward position wherein said pins are in the radially outward end of said recesses.

9. A speed responsive clutch comprising an axially bored driving member having a hub, a plurality of centrifugally responsive segments jointly forming a multi-segmented disc circumjacent said hub and having a clutching surface on the outer periphery thereof, each of said segments carrying a single pin, said driving member having a plurality of peripherally spaced apart elongated recesses each of which slidably receives one of said pins, a drum rotatably journalled on said hub and having a circumferential rim disposed radially outward from said clutching surface on said multi-segmented disc, resilient means for normally retaining said centrifugally responsive segments in a position wherein said pins are in one end of said recesses and said clutching surface on said multi-segmented disc is free of said rim, the opposite end of each said recess being radially outward from said one end and said radially outward end being circumferentially spaced from said radially inward end in a direction opposite to the direction of rotation of said driving member, said segments being adapted in response to a predetermined rotational velocity to simultaneously move to a position wherein said pins are in the radially outward end of said recesses and said clutching surface on said multi-segmented disc is in engagement with the inner periphery of said rim.

10. A speed responsive clutch comprising an axially bored rotatable driving member having a hub, a plurality of centrifugally responsive segments jointly forming a multi-segmented disc circumjacent said hub and having a frictional clutching surface near the outer margin thereof for engaging a member to be driven, each of said segments carrying a single pin, said driving member being provided with a plurality of peripherally spaced apart, elongated recesses radially outward from said hub each of which slidably receives one of said pins, resilient means for normally retaining said segments in a position wherein said pins are in one end of said recesses, the opposite end of each said recess being radially outward from said one end and said radially outward end being circumferentially spaced from said radially inward end in a direction opposite to the direction of rotation of said driving member, said segments being adapted in response to a predetermined rotational velocity to move simultaneously to a position wherein said pins are in the radially outward end of said recesses.

11. In a centrifugal clutch, in combination, a rotatable driving member, a plurality of centrifugal members rotatably driven by said driving member and movable simultaneously between an inner position, wherein said centrifugal members are free of a driven member, and an outer position wherein said centrifugal members are adapted to engage said driven member, resilient means for normally retaining said centrifugal members in said inner position, means for moving said centrifugal members circumferentially relative to said driving member and opposite to the direction of rotation thereof as they move between said inner and outer positions, an interlocking member rotatable relative to said driving member, and interengaging means between said interlocking member and each of said centrifugal members permitting movement of said centrifugal members in axial planes only relative to said interlocking member, said interengaging means and said means for moving said centrifugal members circumferentially coacting to permit only simultaneous movement of said centrifugal members between said inner and outer positions.

12. In a centrifugal clutch, in combination, a rotatable driving member, a plurality of centrifugal members movable simultaneously between an inner position, wherein they are free of a driven element, and an outer position wherein they are adapted to engage said driven element, a plurality of means for drivingly connecting said driving member to each of said centrifugal members and for moving said centrifugal members circumferentially relative to said driving member and opposite to the direction of rotation thereof as said centrifugal members move between said inner and outer positions, each of said means including a camming surface on one of said members having a first portion which is further removed in a radial direction from the axis of rotation of said driving member than a second portion thereof and said first portion being circumferentially spaced from said second portion in a direction opposite to the direction of rotation of said driving member, the other member having a part radially outward from and slidable along said camming surface between said first and second portions as said centrifugal members move between said inner and outer positions, resilient means for normally retaining said centrifugal members in said inner position wherein said parts are on said second portion of said camming surfaces, and means for interlocking said centrifugal members and permitting only simultaneous movement thereof between said inner and outer positions.

13. In a centrifugal clutch, in combination, a rotatable driving member, a plurality of centrifugal members rotatably driven by said driving members and movable simultaneously between an inner position, wherein said centrifugal members are free of a driven member, and an outer position wherein said centrifugal members are adapted to engage said driven member, resilient means normally retaining said centrifugal members in said inner position, means for moving said centrifugal members circumferentially relative to said driving member and opposite to the direction of rotation thereof as they move between said inner and outer positions, and means for interlocking said centrifugal members and preventing their independent movement between said inner and outer positions.

14. In a centrifugal clutch, in combination, a rotatable driving member, a plurality of centrifugal members movable simultaneously between an inner position, wherein they are free of a driven element, and an outer position wherein they are adapted to engage said driven element, a plurality of means for drivingly connecting said driving member to each of said centrifugal members and for moving said centrifugal members circumferentially relative to said driving member and opposite to the direction of rotation thereof as said centrifugal members move between said inner and outer positions, each of said means including a single projection carried by one of said members extending parallel to the axis of rotation of said driving member, the other member having an elongated recess, said projection being slidable within said recess as said centrifugal members move between said inner and outer positions, resilient means for normally retaining said centrifugal members in said inner position wherein said projections are in one end of said recesses, the opposite end of each said recess being radially outward from said one end and said radially outward end being circumferentially spaced from said radially inward end in a direction opposite to the direction of rotation of said driving member, and means for interlocking said centrifugal members and permitting only simultaneous movement thereof between said inner and outer positions.

15. In a centrifugal clutch, in combination, a rotatable driving member, a plurality of centrifugal members rotatably driven by said driving member and movable simultaneously between an inner position, wherein said centrifugal members are free of a driven member, and an outer position wherein said centrifugal members are adapted to engage said driven member, said driving member having a plurality of circumferentially spaced apart elongated recesses, each of said centrifugal members having a single projection extending parallel to the axis of rotation of said driving member into one of said recesses, resilient means normally retaining said centrifugal members in said inner position wherein said projections are in one end of said recesses, the opposite end of each of said recesses being radially outward from said one end and said radially outward end being circumferentially spaced from said radially inward end in a direction opposite to the direction of rotation of said driving member, and means for interlocking said centrifugal members and preventing their independent movement between said inner and outer positions.

16. In a centrifugal clutch, in combination, a rotatable driving element, a plurality of centrifugal members rotatably driven by said driving element and movable simultaneously between an inner position, wherein they are free of a driven element, and an outer position wherein they are adapted to engage said driven element, resilient means for normally retaining said centrifugal members in said inner position, means for moving said centrifugal members circumferentially relative to said driving element and opposite to the direction of rotation thereof as they move between said inner and outer positions, an interlocking member rotatable relative to said driving element, and a plurality of means for interengaging said interlocking member with each of said centrifugal members, each of said means including a radial projection carried by one of said members, the other of said members having a radial recess slidably receiving said radial projection, said radial projections sliding within said radial recesses and permitting only radial movement of said centrifugal members relative to said interlocking member as said centrifugal members move between said inner and outer positions.

17. In a centrifugal clutch, in combination, a rotatable driving member, a plurality of centrifugal members movable simultaneously between an inner position, wherein they are free of a driven element, and an outer position wherein they are adapted to engage said driven element, a plurality of means for drivingly connecting said driving member to each of said centrifugal members and for moving said centrifugal members circumferentially relative to said driving member as said centrifugal members move between said inner and outer positions, each of said means including a camming surface carried by one of said members and having a first portion which is further removed in a radial direction from the axis of rotation of said driving member than a second portion thereof and said first portion being circumferentially spaced from said second surface in a direction opposite to the direction of rotation of said driving member, the other of said members having a single projection radially outward from said camming surface extending parallel to the axis of rotation of said driving member and slidable along said camming surface between said first and second portions as said centrifugal members move between said inner and outer positions, resilient means for normally retaining said centrifugal members in said inner position wherein said projections are on said second portion of said camming surfaces, an interlocking member rotatable relative to said driving member, and a plurality of means for interengaging said interlocking member with each of said centrifugal members, each of said means including a radial projection carried by one of said members, the other member having a radial opening for receiving said radial projection, said interengaging means and said means for moving said centrifugal members circumferentially relative to said driving member coacting to permit only simultaneous movement of said centrifugal members between said inner and outer positions.

18. In a centrifugal clutch, in combination, a rotatable driving member, a plurality of centrifugal members rotatably driven by said driving member and movable simultaneously between an inner position, wherein said centrifugal members are free of a driven member, and an outer position wherein said centrifugal members are adapted to engage said driven member, each of said centrifugal members having a radial groove therein, resilient means normally retaining said centrifugal members in said inner position, means for moving said centrifugal members circumferentially relative to said driving member and opposite to the direction of rotation thereof as they move between said inner and outer positions, an interlocking member rotatable relative to said driving member and having a plurality of radial projections each of which extends into one of said grooves in said centrifugal members, said projections sliding within said grooves and permitting only radial movement of said centrifugal members relative to said interlocking member.

19. In a centrifugal clutch, in combination, a rotatable driving member, a plurality of centrifugal members movable simultaneously between an inner position, where they are free of a driven element, and an outer position wherein they are adapted to engage said driven element, resilient means for normally retaining said centrifugal members in said inner position, a plurality of means for drivingly connecting said driving member to each of said centrifugal members and for moving said centrifugal members circumferentially relative to said driving member and opposite to the direction of rotation thereof as they move from said inner to said outer position, each of said means including a single projection carried by one of said members extending parallel to the axis of rotation of said driving member, the other member having a camming surface, said projecton being radially outward from said camming surface and being movable along said surface and said surface having a first portion which is further removed in a radial direction from the axis of rotation of said driving member than a second portion thereof and said first portion being circumferentially spaced from said second portion in a direction opposite to the direction of rotation of said driving member, the reaction of said driven element on said centrifugal members, when they are in said outer position, tending to hold said projections on said outer portion of said camming surfaces.

20. In a centrifugal clutch, in combination, a rotatable driving member, a plurality of centrifugal members movable simultaneously between an inner position, where they are free of a driven element, and an outer position wherein they are adapted to engage said driven element, resilient means for normally retaining said centrifugal members in said inner position, a plurality of means for drivingly connecting said driving member to each of said centrifugal members and for moving said centrifugal members circumferentially relative to said driving member and opposite to the direction of rotation thereof as they move from said inner to said outer position, each of said means including a single projection carried by one of said members extending parallel to the axis of rotation of said driving member, the other member having a camming surface, said projection being radially outward from said camming surface and being movable along said camming surface and said surface having a first portion which is further removed in a radial direction from the axis of rotation of said driving member than a second portion thereof and said first portion being circumferentially spaced from said second portion in a direction opposite to the direction of rotation of said driving member, an interlocking member rotatable relative to said driving member, and a plurality of means for interengaging said interlocking member with each of said centrifugal members, each of said interengaging means including a radial projection carried by one of said members, the other member having a radial opening for slidably receiving said radial projection, the reaction of said driven element on said centrifugal members, when they are in said outer position, tending to hold said projections on said outer portion of said camming surfaces.

21. A speed responsive clutch comprising, in combination, a rotatable driving member, a plurality of centrifugally responsive members having surfaces near the outer margin thereof for engaging an element to be driven and being movable simultaneously between a radially inward position wherein said surfaces are free of said element to be driven and a radially outward position wherein said surfaces are adapted to engage said element to be driven, a plurality of means for drivingly connecting said driving member to each said centrifugally responsive member and for moving it circumferentially relative to said driving member and counter to the direction of rotation thereof as said centrifugally responsive members move between said radially inward and radially outward positions, each of said means including a single pin carried by one of said members, the other member having an elongated recess slidably receiving said pin, resilient means for normally retaining said centrifugally responsive members in said radially inward position wherein said pins are in one end of said recesses, the opposite end of each said recess being radially outward from said one end and said opposite end being circumferentially spaced from said one end in a direction opposite to the direction of rotation of said driving member, said centrifugally responsive members being adapted in response to a predetermined rotational velocity to move simultaneously to said radially outward position wherein said pins are in said opposite end of said recesses.

22. A speed responsive clutch comprising, in combination, an axially bored rotatable driving member having a hub, a plurality of centrifugally responsive members jointly forming a multi-segmented disc circumjacent said hub and having a frictional clutching surface near the outer margin thereof and being simultaneously movable between a radially inward position and a radially outward position, a plurality of means for drivingly connecting said driving member to each centrifugally responsive member and for moving it circumferentially relative to said driving member and opposite to the direction of rotation thereof as said centrifugally responsive members move between said radially inward and radially outward positions, each of said means comprising a single pin carried by one of said members, the other of said members having an elongated recess slidably receiving said pin, resilient means for normally retaining said centrifugally responsive members in said radially inward position wherein said pins are in one end of said recesses, the opposite end of each said recess being radially outward from said one end and said opposite end being circumferentially spaced from said one end in a direction opposite to the direction of rotation of said driving member, said centrifugally responsive members being adapted in response to a predetermined rotational velocity to simultaneously move to said radially outward position wherein said pins are in said opposite end of said recesses, an interlocking member circumjacent said hub and rotatable relative to said driving member, and means for permitting said centrifugally responsive members to move relative to said interlocking member only in planes coincident with the axis of rotation of said driving member.

23. A speed responsive clutch comprising, in combination, an axially bored rotatable driving member, a plurality of centrifugally responsive members each having a surface for engaging an element to be driven and being movable simultaneously between a radially inward position, wherein said surface is free of said element to be driven, and a radially outward position wherein said surface is adapted to engage said element to be driven, a plurality of means for drivingly connecting said driving member to each said centrifugally responsive member and for moving it circumferentially relative to said driving member and opposite to the direction of rotation thereof as said centrifugally responsive members move between said radially inward and radially outward positions, each of said means including a single pin carried by one of said members, the other member having an elongated recess slidably receiving said pin, resilient means for normally retaining said centrifugally responsive members in said radially inward position wherein said pins are in one end of said recess, said driving member having a circumferential surface, a circular bearing on said circumferential surface adapted to rotatably support said element to be driven and permit it to turn on said driving member free of said centrifugally responsive members when said centrifugally responsive members are in said radially inward position, the opposite end of each said recess being radially outward from said one end and said opposite end being circumferentially spaced from said one end in a direction opposite to the direction of rotation of said driving member, said centrifugally responsive members being adapted in response to a predetermined rotational velocity to simultaneously move to said radially outward position wherein said pins are in said opposite end of said recesses.

24. A speed responsive clutch comprising, in combination, a driving member having a frusto-conical belt engaging surface near the outer margin thereof, a plurality of centrifugally responsive members jointly forming a multi-segmented member coaxial with said driving member and having a frusto-conical belt engaging surface near the outer margin thereof opposite said belt engaging surface on said driving member, a plurality of means for drivingly connecting said driving member to each said centrifugally responsive member, resilient means normally urging said centrifugally responsive members to an inner position wherein said frusto-conical surface on said multi-segmented member is free of a belt disposed between said driving member and said multi-segmented member, said centrifugally responsive members being adapted in response to a predetermined rotational velocity to move radially outward until said frusto-conical surface on said multi-segmented member engages said belt and compresses said belt against said frusto-conical surface on said driving member.

25. A speed responsive clutch comprising, in combination, a driving member having a frusto-conical belt engaging surface near the outer margin thereof, a plurality of centrifugally responsive members jointly forming a multi-segmented member coaxial with said driving member and having a frusto-conical belt engaging surface near the outer margin thereof opposite said belt engaging surface on said driving member, resilient means normally urging said centrifugally responsive members to a radially inward position wherein said frusto-conical surface on said driving member is free of a belt disposed between said driving member and said multi-segmented member, said centrifugally responsive members being adapted in response to a predetermined rotational velocity to move from said radially inward position to a radially outward position wherein said frusto-conical surface on said multi-segmented member engages said belt and urges it against said frusto-conical surface on said driving member, a plurality of means for drivingly connecting said driving member to each said centrifugally responsive member and for moving said centrifugally responsive members circumferentially relative to said driving member and opposite to the direction of rotation thereof as they move from said radially inward to said radially outward position, and means for interlocking said centrifugally responsive members and preventing their independent movement between said radially inward and radially outward positions.

26. A speed responsive clutch comprising, in combination, a driving member having a frusto-conical belt engaging surface near the outer margin thereof, a plurality of centrifugally responsive members jointly forming a multi-segmented member coaxial with said driving member and having a frusto-conical belt engaging surface near the outer margin thereof opposite said belt engaging surface on said driving member, resilient means normally urging said centrifugally responsive members to a radially inward position wherein said frusto-conical surface on said driving member is free of a belt disposed between said driving member and said multi-segmented member, said centrifugally responsive members being adapted in response to a predetermined rotational velocity to move from said radially inward position to a radially outward position wherein said frusto-conical surface on said multi-segmented member engages said belt and urges it against said frusto-conical surface on said driving member, a plurality of means for drivingly connecting said driving member to each said centrifugally responsive member and for moving said centrifugally responsive members circumferentially relative to said driving member and opposite to the direction of rotation thereof as they move from said radially inward to said radially outward position, an interlocking member rotatable relative to said driving member, and interengaging means between said interlocking member and each centrifugally responsive member permitting movement of said centrifugally responsive member only in axial planes relative to said interlocking member, said interengaging means and said means for moving said centrifugally responsive members circumferentially coacting to permit only simultaneous movement of said centrifugally responsive members between said radially inward and radially outward positions.

References Cited in the file of this patent

UNITED STATES PATENTS

| | | |
|---|---|---|
| 2,235,107 | Kreis | Mar. 18, 1941 |
| 2,623,400 | Davis | Dec. 30, 1952 |
| 2,762,483 | Clark | Sept. 11, 1956 |

FOREIGN PATENTS

| | | |
|---|---|---|
| 32,008 | France | Mar. 22, 1927 |
| | (Second addition 559,845) | |
| 688,351 | Great Britain | Mar. 4, 1953 |